United States Patent Office 3,472,890
Patented Oct. 14, 1969

3,472,890
PRODUCTION OF ACRYLONITRILE
Robert J. Evans, Jacksonville, Ill., and Keith M. Taylor, Ballwin, Mo., assignors to Monsanto Company, St. Louis, Mo., a corporation of Delaware
No Drawing. Filed Dec. 27, 1966, Ser. No. 604,626
Int. Cl. C07c 121/02
U.S. Cl. 260—465.9     7 Claims

ABSTRACT OF THE DISCLOSURE

Acrylonitrile is produced in a non-catalytic process by reacting acetonitrile with an aliphatic hydrocarbon compound.

The present invention relates to a process for the production of acrylonitrile. More particularly, the present invention relates to a new and novel non-catalytic process for the direct synthesis of acrylonitrile from acetonitrile and aliphatic hydrocarbons.

Acrylonitrile is among the most valuable monomers available to the polymer industry for producing useful polymeric products. This valuable monomer is used in the preparation of synthetic fibers, synthetic rubbers and for other useful plastic products. Presently, most of the acrylonitrile is produced by such catalytic processes as the catalytic reaction of acetylene and hydrogen cyanide and the reaction of ammonia and propylene. While the known catalytic processes have proven very effective in producing acrylonitrile, the demand for acrylonitrile is so great as to make desirable the development of new and additional processes for producing acrylonitrile. Also, in general, the catalysts most often used in acrylonitrile production are relatively expensive in cost and handling. For these and other reasons, it would be advantageous to have means of producing acrylonitrile without the use of a catalyst.

It is an object of the present invention to provide a new and novel process for the production of acrylonitrile. Another object of the present invention is to provide a new and novel non-catalytic process for the production of acrylonitrile. An additional object of the present invention is to provide a new and novel process for the production of acrylonitrile by the non-catalytic direct reaction of acetonitrile and aliphatic hydrocarbons. Additional objects will become apparent from the following description of the invention herein disclosed.

The present invention, which fulfills these and other objects, is a process for the preparation of acrylonitrile which comprises subjecting acetonitrile and an aliphatic hydrocarbon to a temperature within the range of 750 to 1000° C. for a period of 0.1 to 20 seconds in the absence of a catalyst. By this process, significant quantities of acrylonitrile are produced. Further, the acrylonitrile is produced without the aid of a catalyst. Since no catalyst is required, the present process results in a reduction of the expense required for catalyst purchase and handling.

In order to further describe as well as to demonstrate the present invention, the following examples are presented. These examples are not to be construed as in any manner limiting the present invention.

EXAMPLE I

A mixture of substantially equimolar quantities of acetonitrile and methane was passed through a reactor tube having a length of 12 inches and an internal diameter of one inch. Nitrogen, as an inert diluent, was introduced into the reactor tube concurrently with the mixture of acetonitrile and methane. The temperature within the reaction tube was approximately 950° C. and the residence time of the reactants within the reaction zone was 4 seconds. Pressure within the reaction zone was essentially atmospheric pressure. The effluent from the reactor tube was passed through a condenser and a liquid product obtained. This liquid product was found to contain 5% by weight of acrylonitrile with the remainder of the liquid product being primarily unreacted acetonitrile.

EXAMPLE II

Example I was substantially repeated with the exception that ethane was used as the aliphatic hydrocarbon and the temperature was 900° C. Also, the residence time was approximately 1.5 seconds. On analysis, the liquid product of this run was found to contain approximately 18% by weight acrylonitrile, the majority of the remainder of the liquid product being unreacted acetonitrile.

EXAMPLE III

Example II was substantially repeated with the exception that the temperature was 800° C. and the residence time was 3 seconds. The liquid product was found to contain approximately 8% by weight acrylonitrile, the remainder of the liquid product being primarily unreacted acetonitrile.

EXAMPLE IV

Example I was substantially repeated with the exception that the aliphatic hydrocarbon was propane, the temperature was 850° C., and the residence time was approximately 1.5 seconds. The liquid product was found to contain 12% by weight acrylonitrile, the remainder of the liquid product being primarily unreacted acetonitrile.

EXAMPLE V

Example IV was substantially repeated with the exception that the temperature was 800° C. and the residence time was 5 seconds. The liquid product was found to contain 7% by weight acrylonitrile, the remainder of the liquid product being primarily unreacted acetonitrile.

EXAMPLE VI

Example I was substantially repeated with the exception that the aliphatic hydrocarbon was 2-methyl pentene-1, the temperature was 850° C., and the residence time was 1.5 seconds. The liquid product was found to contain approximately 6% by weight acrylonitrile, the remainder of the liquid product being primarily unreacted acetonitrile.

From the above examples, it is readily noted that the present invention represents a means to produce significant quantities of acrylonitrile without the use of a catalyst.

The aliphatic hydrocarbons useful in the process of the present invention include both the saturated and unsaturated aliphatic hydrocarbons. These aliphatic hydrocarbons may be straight chain or branched chain. If unsaturated, the aliphatic hydrocarbons may be terminally or internally unsaturated. The molecular weight of the aliphatic hydrocarbons may vary substantially ranging from methane up to aliphatic hydrocarbons having 30 to 40 carbon atoms and higher. Choice of molecular weight of aliphatic hydrocarbon for use in the process of the present invention is primarily a matter of practicality. Among the aliphatic hydrocarbons which may be used in carrying out the process of the present invention are the following non-limiting examples: methane, ethane, propane, popylene, n-butane, n-butenes, isobutane, isobutenes, n-pentane, n-pentenes, n-hexenes, 2-methyl pentane, 3-methyl pentane, 2-methyl pentenes, n-heptane, n-heptenes, methyl heptanes, methyl heptenes, dimethyl heptanes, methyl ethyl heptenes, n-octane, n-octenes, n-nonane, n-nonenes, and the like. As a practical matter, the aliphatic hydrocarbons used in the process of the present invention are the paraffin and olefin hydrocarbons of less than 20 carbon atoms. In the preferred practice of the present invention, the aliphatic hydrocarbons are paraffin hydrocarbons of 1 to 10 carbon atoms and olefin hydrocarbons of 3 to 10 carbon atoms.

The acetonitrile and the aliphatic hydrocarbons most often are introduced into the reaction zone in a molar ratio of acetonitrile to aliphatic hydrocarbon within the range of 10:1 to 1:10. The preferred mol ratio will vary to some extent with the molecular weight of the aliphatic hydrocarbons employed. In a general sense, it may be said that higher ratios of acetonitrile to aliphatic hydrocarbons may be used as the molecular weight of the hydrocarbon increases. This results from the fact that at the temperatures at which the process is carried out, some cracking of the aliphatic hydrocarbons will usually take place. Therefore, with higher molecular weight aliphatic hydrocarbons, the cracking of one mol of such hydrocarbon may result in the formation of two or more mols of lower molecular weight aliphatic hydrocarbons available for reaction with the acetonitrile to form acrylonitrile. With the preferred aliphatic hydrocarbons, herein above defined, acetonitrile to aliphatic hydrocarbon mol ratios within the range of 1:5 to 5:1 are usually employed in the practice of the present invention.

The temperatures at which the process of the present invention is operated, generally, are within the range of 750 to 1000° C. At temperatures below 750° C., reaction is below practical limitations. Above 1000° C., cracking of the reactants becomes excessive. Within the above defined temperature range, it has been found that the optimum reaction temperature decreases slightly with the increase in molecular weight of the aliphatic hydrocarbon. In the preferred practice of the process of the present invention, temperatures within the range of 850 to 975° C. are most often used.

The pressure at which the process of the present invention is operated is not particularly critical and may be varied over wide ranges. The pressure may be subatmospheric, atmospheric or superatmospheric. Most often, the pressure at which the process of the present invention is operated is within the range of 5 to 100 p.s.i.a. As a practical matter, the present invention is usually operated at or near atmospheric pressure, i.e., 14.5 to 20 p.s.i.a.

In operating the present process, the residence time of the acetonitrile and aliphatic hydrocarbons within the reaction zone most often is within the range of 0.1 to 20 seconds. The optimum residence time will vary according to temperature, lower residence time being used with higher temperatures and conversely, longer residence time being used with lower temperatures. In the preferred practice of the process of the present invention, a residence time of 1 to 10 seconds is most often employed.

In carrying out the process of the present invention, it is often desirable to carry out the reaction of the acetonitrile and aliphatic hydrocarbon in the presence of a diluent. Such a diluent is inert to the chemical reaction taking place within the reaction zone. Exemplary of materials which may be used as diluents are nitrogen, helium, argon, carbon-dioxide, and the like. Among the preferred diluents are nitrogen and helium with nitrogen being the most useful. When a diluent is used, it may be used in practically any concentration. However, as a practical matter, the diluent is most often present in a mol ratio of diluent to combined acetonitrile and aliphatic hydrocarbon within the range of 0.25:1 to 3:1.

What is claimed is:

1. A process for the preparation of acrylonitrile which comprises subjecting acetonitrile and propane to a temperature within the range of 750 to 1000° C. for a period of 0.1 to 20 seconds in the absence of a catalyst.

2. The process of claim 1 wherein the mol ratio of acetonitrile and propane is within the range of 1:10 to 10:1.

3. The process of claim 1 wherein the temperature is within the range of 850 to 975° C.

4. The process of claim 1 wherein the pressure is within the range of 5 to 100 p.s.i.a.

5. The process of claim 1 wherein the residance time is within the range of 1 to 10 seconds.

6. The process of claim 1 wherein the acetonitrile and propane are subjected to the reaction conditions in the presence of an inert diluent.

7. The process of claim 6 wherein the inert diluent is selected from the group consisting of nitrogen, helium, argon, carbon dioxide and combinations thereof.

References Cited

UNITED STATES PATENTS

| | | | |
|---|---|---|---|
| 2,802,020 | 8/1957 | Fierce et al. | 260—465.3 |
| 3,028,413 | 4/1962 | Fierce et al. | 260—465.3 |
| 3,129,241 | 4/1964 | Krebaum | 260—465.3 |
| 3,141,034 | 7/1964 | Krebaum | 260—465.9 |

JOSEPH P. BRUST, Primary Examiner

U.S. Cl. X.R.

260—465.3